United States Patent
Srinivasa Gopalan et al.

(10) Patent No.: US 10,142,915 B2
(45) Date of Patent: Nov. 27, 2018

(54) METHOD AND SYSTEM FOR PROVIDING MULTIPLE SERVICE DISCOVERY IN A WIRELESS ENVIRONMENT

(71) Applicant: Samsung Electronics Co., Ltd., Gyeonggi-do (KR)

(72) Inventors: Karthik Srinivasa Gopalan, Bangalore (IN); Mayuresh Madhukar Patil, Bangalore (IN); Jong-Hyo Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/906,222

(22) PCT Filed: Jul. 18, 2014

(86) PCT No.: PCT/KR2014/006530
§ 371 (c)(1),
(2) Date: Jan. 19, 2016

(87) PCT Pub. No.: WO2015/009097
PCT Pub. Date: Jan. 22, 2015

(65) Prior Publication Data
US 2016/0174134 A1 Jun. 16, 2016

(30) Foreign Application Priority Data

Jul. 18, 2013 (IN) .......................... 3216/CHE/2013
Jun. 23, 2014 (IN) .......................... 3216/CHE/2013

(51) Int. Cl.
*H04W 4/00* (2018.01)
*H04W 48/08* (2009.01)
(Continued)

(52) U.S. Cl.
CPC ........... *H04W 48/08* (2013.01); *H04W 48/14* (2013.01); *H04W 48/16* (2013.01)

(58) Field of Classification Search
CPC ................................. G06F 15/16; H04L 12/28
(Continued)

(56) References Cited

U.S. PATENT DOCUMENTS

2006/0116160 A1 * 6/2006 Fuccello ............... H04W 48/16
455/556.1
2007/0141988 A1 6/2007 Kuehnel et al.
(Continued)

FOREIGN PATENT DOCUMENTS

CN 102597982 7/2012
CN 102598632 7/2012
(Continued)

OTHER PUBLICATIONS

PCT/ISA/210 Search Report issued on PCT/KR2014/006530 (pp. 3).
(Continued)

*Primary Examiner* — Iqbal Zaidi
(74) *Attorney, Agent, or Firm* — The Farrell Law Firm, P.C.

(57) ABSTRACT

A method and apparatus are provided for performing multiple service discovery in a wireless environment. The method includes generating a probe request containing a class information and a sub class information of a plurality of advertiser devices by a seeker device, transmitting the probe request for service discovery to at least one advertiser device of the plurality of advertiser devices and receiving a probe response from the at least one advertiser device. The probe response comprises at least one of the class information and the sub-class information associated with the at least one advertiser device.

11 Claims, 7 Drawing Sheets

(51) Int. Cl.
*H04W 48/14* (2009.01)
*H04W 48/16* (2009.01)

(58) Field of Classification Search
USPC .......................... 370/254–339; 709/217–230
See application file for complete search history.

(56) References Cited

U.S. PATENT DOCUMENTS

| | | |
|---|---|---|
| 2009/0285119 A1 | 11/2009 | Horn et al. |
| 2009/0287827 A1 | 11/2009 | Horn et al. |
| 2010/0235525 A1 | 9/2010 | McGuire et al. |
| 2011/0106837 A1 | 5/2011 | Walton et al. |
| 2011/0153818 A1 | 6/2011 | Vandwaile et al. |
| 2012/0185487 A1* | 7/2012 | Liang .................. H04L 67/1097 707/747 |
| 2013/0094484 A1 | 4/2013 | Kneckt et al. |
| 2013/0204962 A1* | 8/2013 | Estevez .................. H04N 7/185 709/217 |
| 2014/0337544 A1* | 11/2014 | Huang .................. G06F 13/385 710/63 |
| 2014/0359148 A1* | 12/2014 | Cherian .................. H04L 41/28 709/229 |

FOREIGN PATENT DOCUMENTS

| | | |
|---|---|---|
| KR | 10-2007-0069800 | 7/2007 |
| KR | 10-2009-0014208 | 2/2009 |
| WO | WO 2011/053884 | 5/2011 |
| WO | WO 2012/127095 | 9/2012 |

OTHER PUBLICATIONS

European Search Report dated Feb. 21, 2017 issued in counterpart application No. 14826271.0-1854, 9 pages.
Chinese Office Action dated Mar. 22, 2018 issued in counterpart application No. 201480040862.5, 22 pages.

* cited by examiner

METHOD AND SYSTEM FOR PROVIDING MULTIPLE SERVICE DISCOVERY IN A WIRELESS ENVIRONMENT

PRIORITY

This application is a National Phase Entry of PCT International Application No. PCT/KR2014/006530, which was filed on Jul. 18, 2014, which claims priority to Indian Patent Application Serial Nos. 3216/CHE/2013 (PS) and 3216/CHE/2013 (CS), which were filed in the Indian Patent Office on Jul. 18, 2013 and Jun. 23, 2014, respectively, the entire content of each of which is incorporated herein by reference.

BACKGROUND

1. Field of the Invention

The present invention relates generally to wireless communication systems, and more particularly, to a method and apparatus for providing multiple service discovery in a wireless environment.

2. Description of the Related Art

Wireless communication technologies such as Bluetooth, Infrared, etc., are used by devices to communicate wirelessly over a relatively short range, e.g., less than 100 meters.

Generally, to discover other wireless devices within a communication range, a device broadcasts wireless messages and waits for responses to the wireless messages from other devices. If another device is discovered, a wireless connection may be established between the devices.

Once a connection is established, devices may exchange various types of information. For example, devices may exchange information related to providing a service, e.g., printing, headset connectivity, personal digital assistant (PDA) synchronization, etc., provided by one of the devices.

Currently, Wireless Fidelity (Wi-Fi®) alliance has defined an application service platform for advertising available. Further, the Wi-Fi® application service platform allows the adding of multiple service hash values, when a device supports multiple services. The service hash values are generally 6 bytes in size.

FIG. 1 is a signal flow diagram illustrating a conventional method for providing multiple service discovery in a wireless environment.

Referring to FIG. 1, an individual service 104 in an advertiser device 102 advertises itself to an application service platform (ASP) 106 in the advertiser device 102 with a full reverse Domain Name System (DNS) service name. A service 112 in a seeker device 110 can seek a service by sending a seek service primitive, which includes requested service name to be searched, to an ASP 114 of the seeker device 110. The ASP 114 then triggers a probe request message including a service hash attribute. For example, the ASP 114 calculates the service hash value for the requested service name using a 256 secure hash algorithm (SHA) 1 algorithm. After the service hash value for the service name is calculated, the first 6 bytes are sent in the probe request message.

When the advertiser device 102 receives the probe request message, the advertiser device 102 matches the received service hash value with a service hash value of one or more registered service names. After a match is found, the advertiser device 102 sends a probe response message to the seeker device 110. The probe response message includes the matched full service name.

After the seeker device 110 receives the probe response message and the device discovery is completed, the seeker device 110 identifies the advertiser device 102 and the supported service 104. The seeker device 110 then performs service discovery with the all of the searched devices in order to determine detail information about the service. For example, the seeker device 110 sends service discovery request, such as a service discovery generic advertisement service (GAS) request requesting details of the service 104. The advertiser device 102 responds to the service discovery GAS request in a service discovery response, e.g., a GAS response. The GAS response includes the details of the services (e.g., for A send service, the response includes role of the devices such as a transmitter or a receiver, a serviced version number, etc.)

Currently, wireless serial bus (WSB) is being developed to support universal serial bus (USB) over a Wi-Fi® network. The procedure for performing device discovery, service discovery, and connection over a Wi-Fi® Direct network is as defined in the Wi-Fi® standards. WSB defines three kinds of architecture elements (roles), which include a host service, a client service, and a hub service. The advertiser device 102 and the seeker device 110 can take any kind of the role during a WSB session. However, one WSB session supports only one host role.

Conventional USB architecture requires a USB class, a USB subclass, and an interface to be exchanged during a service discovery mechanism. However, current ASP architecture requires the seeker device to perform service discovery of all USB devices in order to identify a USB device within the particular device class, which requires too much information exchange.

Further, if a single USB device supports multiple USB classes, which may be the case for high end devices such as smart phones and tablets, the seeker device may require a substantial amount of hash information to be sent during the device discovery in order to represent this information in the service hash, thereby leading to unnecessary service discovery message exchange between the seeker device and advertiser device.

In view of the foregoing, there is a need for a method and apparatus for performing device discovery that avoids unnecessary message flow in a wireless environment.

SUMMARY

The present invention has been made to address at least the above and other problems and disadvantages, and to provide at least the advantages described below.

In accordance with an embodiment of the present invention, a method and system are provided for providing multiple service discovery in a wireless environment. The method includes generating, by a seeker device, a probe request containing a class information and a sub class information of a plurality of advertiser devices, transmitting the probe request for service discovery to at least one advertiser device of the plurality of advertiser devices; and receiving a probe response from the at least one advertiser device, wherein the probe response comprises at least one of the class information and the sub-class information associated with the at least one advertiser device.

In accordance with another embodiment of the present invention, a system for providing multiple service discovery in a wireless environment is provided. The system comprises at least one seeker device in communication with one or more advertiser devices; wherein the at least one seeker device is adapted for: generating a probe request containing a class information and a sub class information of at least one advertiser devices; transmitting the probe request for service discovery to the at least one advertiser device; and receiving a probe response from the at least one advertiser device, where the probe response comprises at least one of the class information and a sub-class information associated with the at least one advertiser device.

BRIEF DESCRIPTION OF THE DRAWINGS

The above and other aspects, features, and advantages of certain embodiments of the present invention will be more apparent from the following detailed description taken in conjunction with the accompanying drawings in which.

DETAILED DESCRIPTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, a method and apparatus are provided for discovering multiple support devices in a wireless environment. In the following detailed description of the embodiments of the invention, reference is made to the accompanying drawings that form a part hereof, and in which are shown by way of illustration certain embodiments in which the invention may be practiced. These embodiments are described in sufficient detail to enable those skilled in the art to practice the invention, and it is to be understood that other embodiments may be utilized and that changes may be made without departing from the scope of the present invention.

In accordance with an embodiment of the present invention, an optimized method and system are provided for providing multiple service discovery in a wireless environment using connection technologies, such as Wi-Fi®.

Embodiments herein allow a seeker device to identify a type of advertiser device using actual class and sub class information exchanged during the service discovery. Embodiments herein further allow the service discovery mechanism for aggregating multiple class information associated with a plurality of advertiser devices into a single hash set, thereby minimizing the information transmitted between devices. The applicability of the methods described herein is not limited to Wi-Fi® or USB.

The present invention further provides a method and apparatus for optimizing service discovery for a serial bus connection, in order for a seeker device to discover actual class and subclass of an advertiser device during service discovery. The service discovery mechanism herein includes two message exchanges, i.e., a probe request and a probe response, between the seeker device and the advertiser device.

Figure 1:
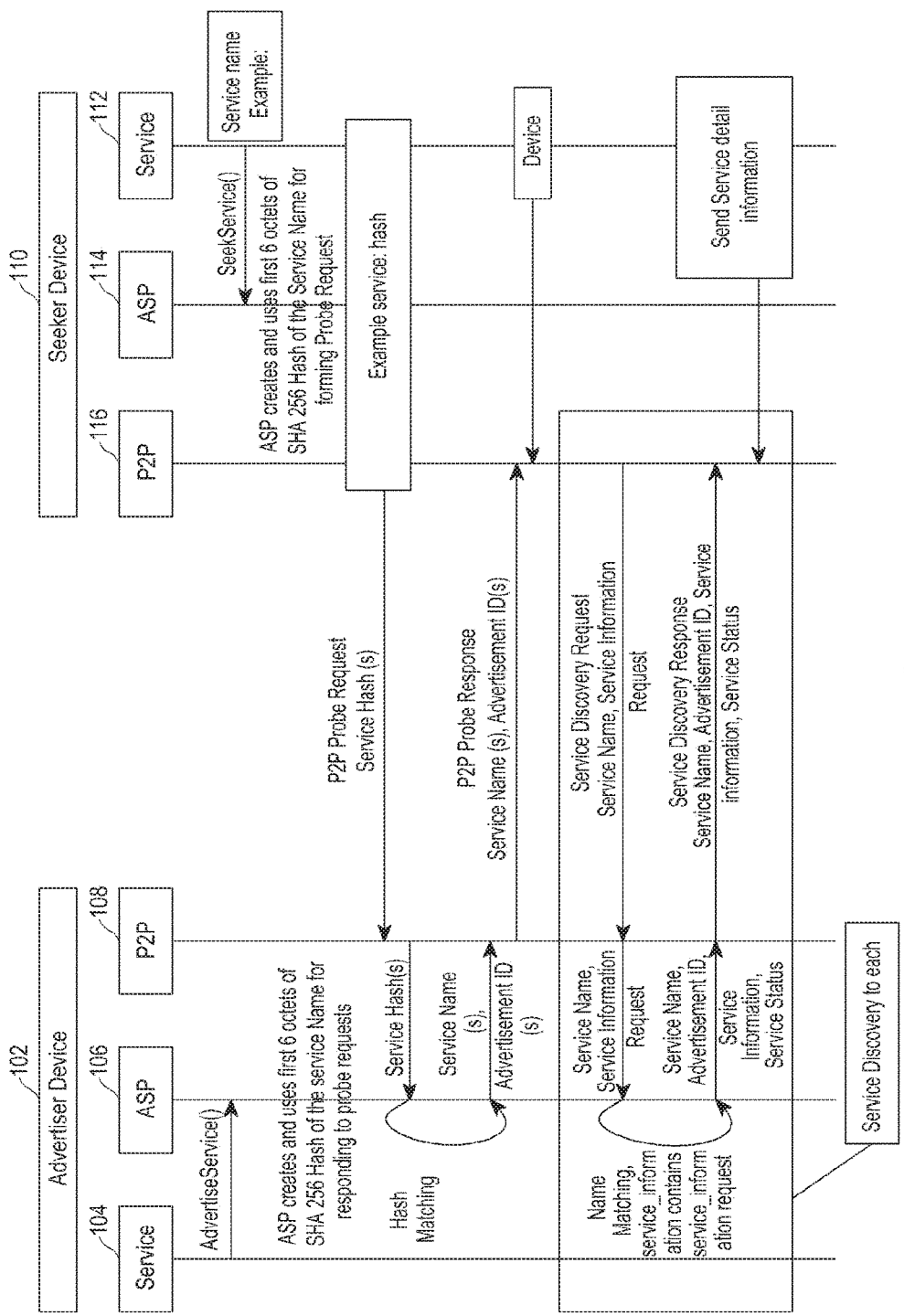
FIG. 1 is a flow diagram illustrating a conventional method for providing multiple service discovery in a wireless environment.
Figure 2:
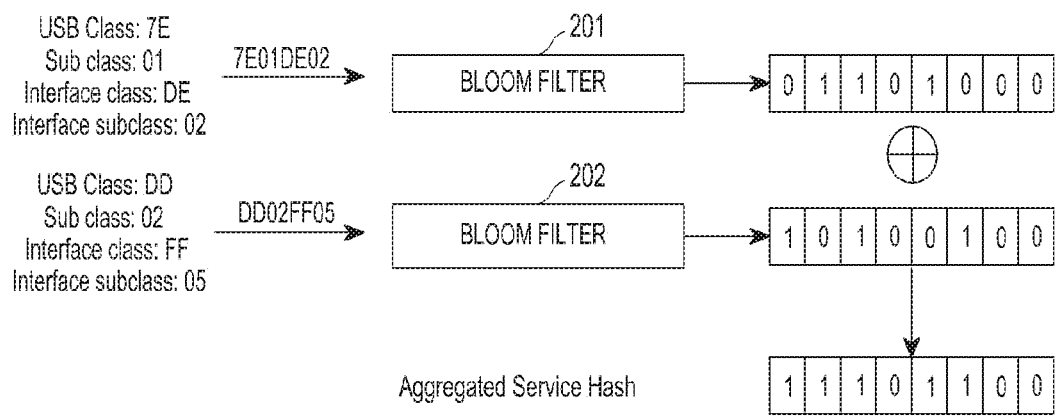
FIG. 2 illustrates a method of generating hash values using a bloom filter, according to an embodiment of the present invention.

FIG. 2 illustrates a method of generating hash values using a bloom filter, according to an embodiment of the present invention.

Referring to FIG. 2, a plurality of hash pairs are defined in a service hash attribute in a probe request. A hash pair is defined by providing service names for WSB architecture element. A hash value of a particular service name is generated using a hash algorithm defined in Wi-Fi® Direct service. For example, hash values for different service names include org.wifi.wsb.host, org.wifi.wsb.client, and org.wifi.wsb.hub.

Bit maps are generated from bloom filters 201 and 202 with K pre-defined hash values for class and sub class string of each wireless device. Each of the bloom filters 201 and 202 comprises k hash functions. The inputs to these hash functions are the service name strings and the class and sub class information of the advertiser devices. Each of the hash functions sets 1 bit in the hash map, thereby creating a k bit code. The aggregation of the service hash corresponds to the XORing of the bloom filter values.

For example, a bit map is generated for each USB class 1 byte, USB sub class 1 byte, interface class 1 byte, and interface sub class 1 byte together. The $4^{th}$ byte of information is sent to the bloom filter 201. This bit map is generated for the each of the USB class and interface classes. The bit map corresponding to respective USB class and sub class are XORed to generate a single bit map corresponding to an aggregated hash value as a second hash value.

Figure 3:
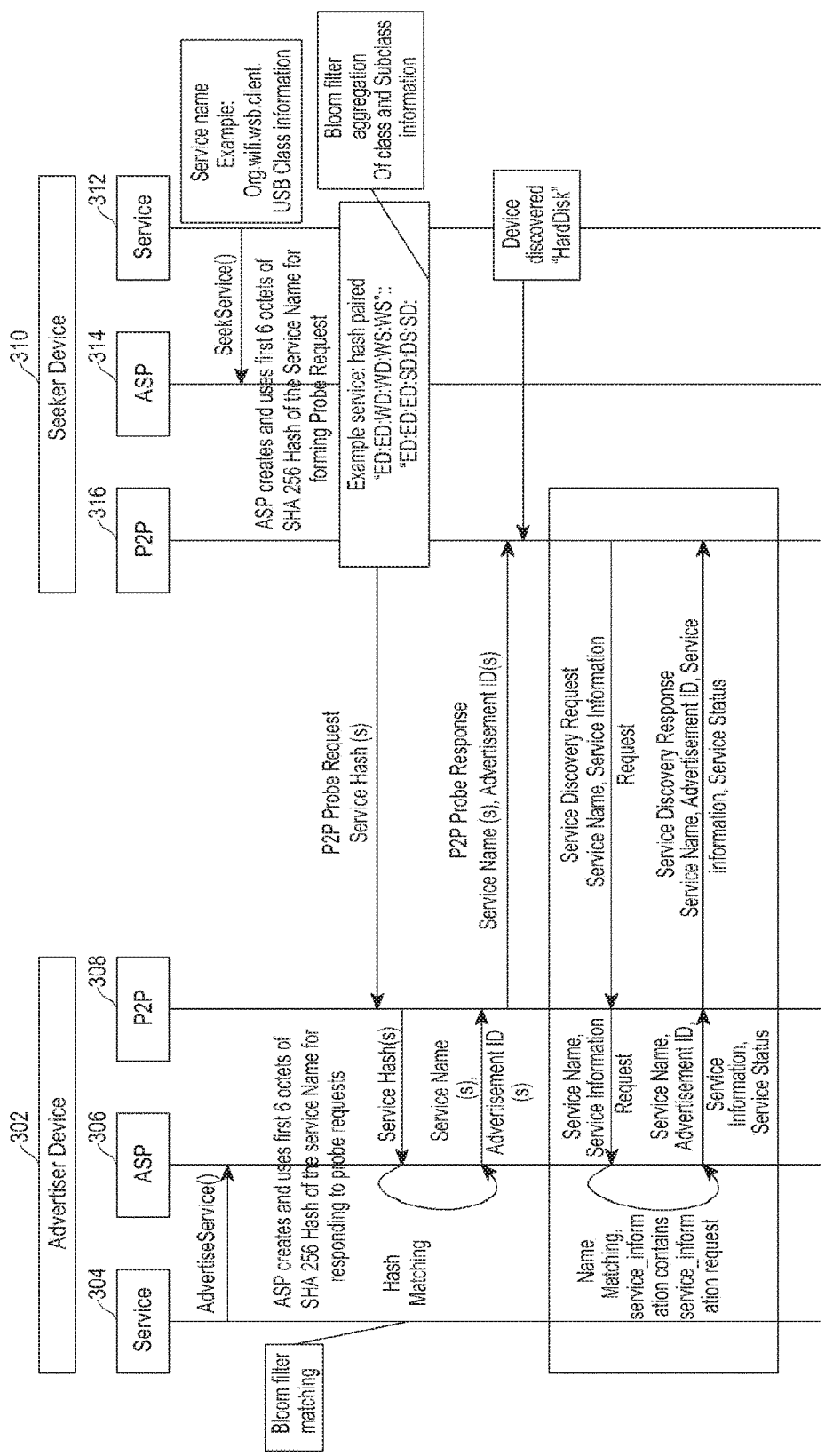
FIG. 3 is a signal flow diagram illustrating a method for providing multiple service discovery in a wireless environment, according to an embodiment of the present invention.

FIG. 3 is a signal flow diagram illustrating a method for discovering multiple service devices in a wireless environment, according to an embodiment of the present invention.

Referring to FIG. 3, a connection is established between an advertiser device 302 and a seeker device 310 through Wi-Fi® P2P interfaces 308 and 316, respectively. In step 320, a service process 304 associated with the advertiser device 302 advertises a service (or services) to an ASP 306 using an AdvertiseService( ) command so that the seeker device 310 may discover an ASP session related to the advertised service(s).

When an application is executed and a service use command is generated to transmit a specific file in the seeker device 310, in step 321, a service process 312 of the seeker device 310 transmits a SeekService( ) command requesting service discovery along with USB class information to the ASP 314 of the seeker device 310.

In step 322, the ASP 310 generates a hash value for the received service name and other relevant hash values, and appends the generated hash values in a P2P probe request.

In step 323, the ASP 314 of the seeker device 310 transmits the generated P2P Probe Request including a hash value generated based on the service name and the USB class and sub class information to the ASP 306 of the advertiser device 302, via the P2P interfaces 316 and 308.

The ASP 306 of the advertiser device 302 determines whether the hash value of the service name to be advertised and the USB class information associated with the advertiser device 302 match the hash value and the USB class information received in the P2P Probe Request. If the hash values and the USB class information matches, then the ASP 306 of the advertiser device 302 transmits a P2P Probe Response to the ASP 114 of the seeker device 110, via the P2P interfaces 308 and 316, in step 324. The P2P Probe Response may include a string value indicating the service name confirmed by hash matching, the matched USB class information, and an advertisement identifier (ID) of the service to be advertised from the advertiser device 302.

Upon receiving the probe response, in step 325, the service process 312 of the seeker device 310 identifies the type of the device discovered, based on the received class and sub class information associated with the advertiser device 302 and displays the service accordingly on a user interface of the seeker device 310.

Figure 4:
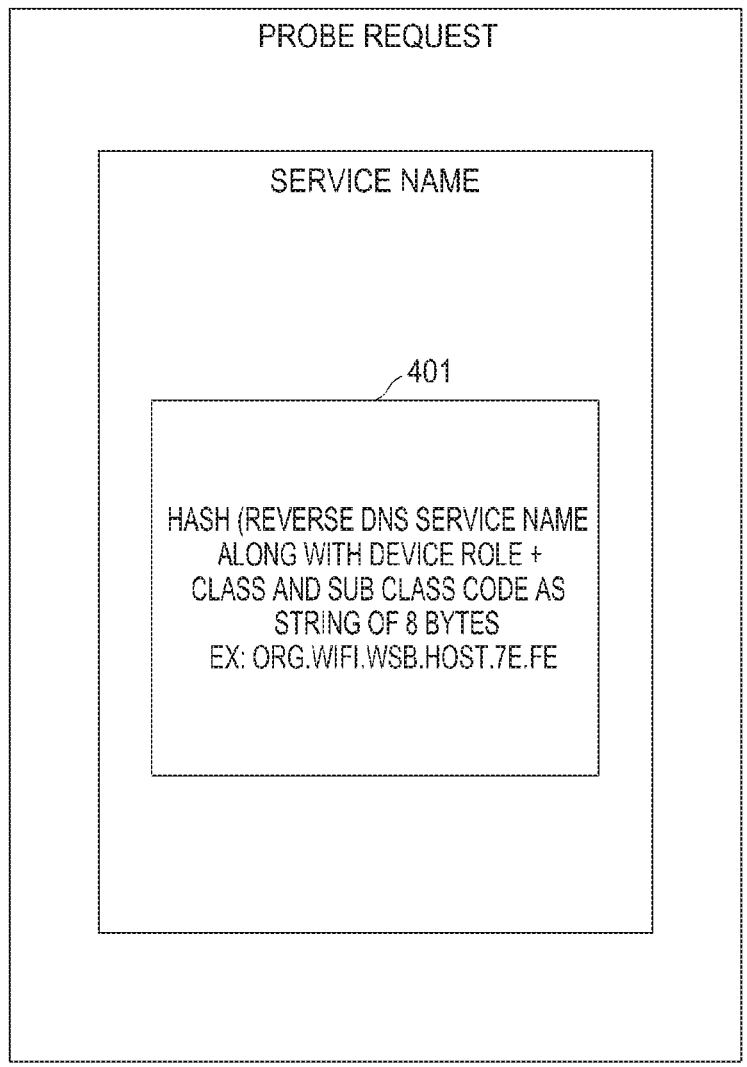
FIG. 4 illustrates a probe request frame, according to an embodiment of the present invention.

FIG. 4 illustrates a probe request frame, according to an embodiment of the present invention.

Referring to FIG. 4, a service name is created by appending the sub class information converted to a string format, which corresponds 8 bytes of information. A hash value for the entire appended string is then generated and included in the probe request. Accordingly, the probe request includes a hash value of reverse DNS service name along with device role and class and sub class code, as a string of 8 bytes of information, in the service hash attribute 401. The probe request includes a single hashing function with the class and sub-class information in a string format.

Figure 5:
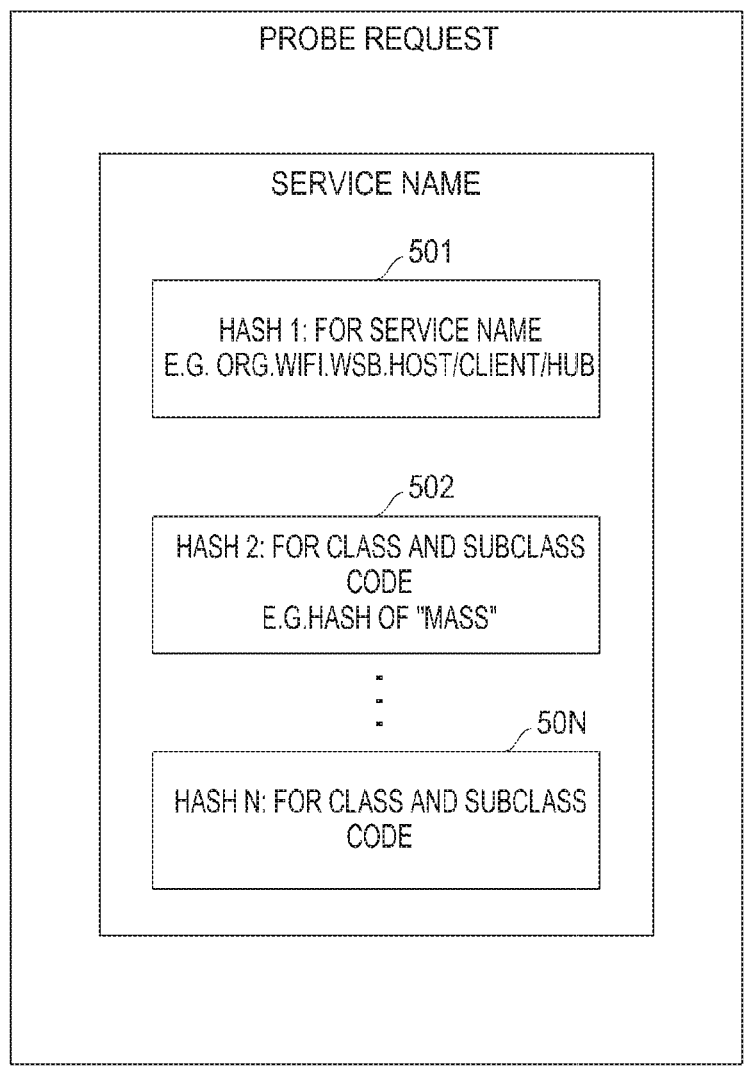
FIG. 5 illustrates a probe request frame, according to another embodiment of the present invention.

FIG. 5 illustrates a probe request frame, according to another embodiment of the present invention.

Referring to FIG. 5, a service name is created and a hash value for the service name is generated, which corresponds to 4 bytes of information. The remaining 4 byte of information corresponds to a particular sequence of hash pairs for a plurality of class and sub class code. Accordingly, the probe request includes a list of hash values appended in a particular sequence in the service hash attribute, wherein the first hash 501 corresponds to a hash for service name, and the consecutive hashes 501 to 50N correspond to class and sub class code of a particular advertiser device.

Figure 6:
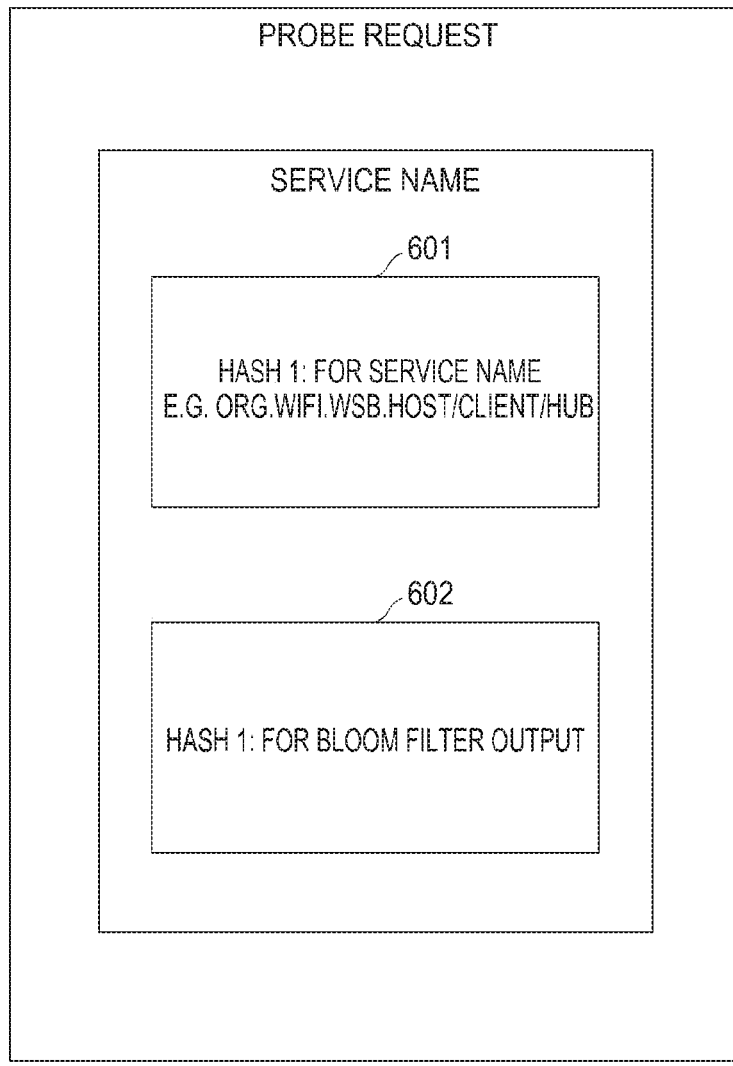
FIG. 6 illustrates a probe request frame, according to another embodiment of the present invention.

FIG. 6 illustrates a probe request frame, according to another embodiment of the present invention.

Referring to FIG. 6, a set of service names corresponding to a plurality of services available at a plurality of advertiser devices are illustrated. Further, a hash value corresponding to a bloom filter output is generated (as described above) and is appended into the probe request. Accordingly, the probe request includes a hash pair, a hash value 601 corresponding to a predefined service name and a hash value 602 for bloom filter output in the service name hash attribute.

According to an embodiment of the present invention, a probe response includes a full name of a service along with device role and an 8 byte string including the class and the sub class code. Alternatively, the probe response includes a new attribute element advertise service descriptor in the "Advertise service attribute" in place of bloom filter hash, as a part of service name.

Figure 7:
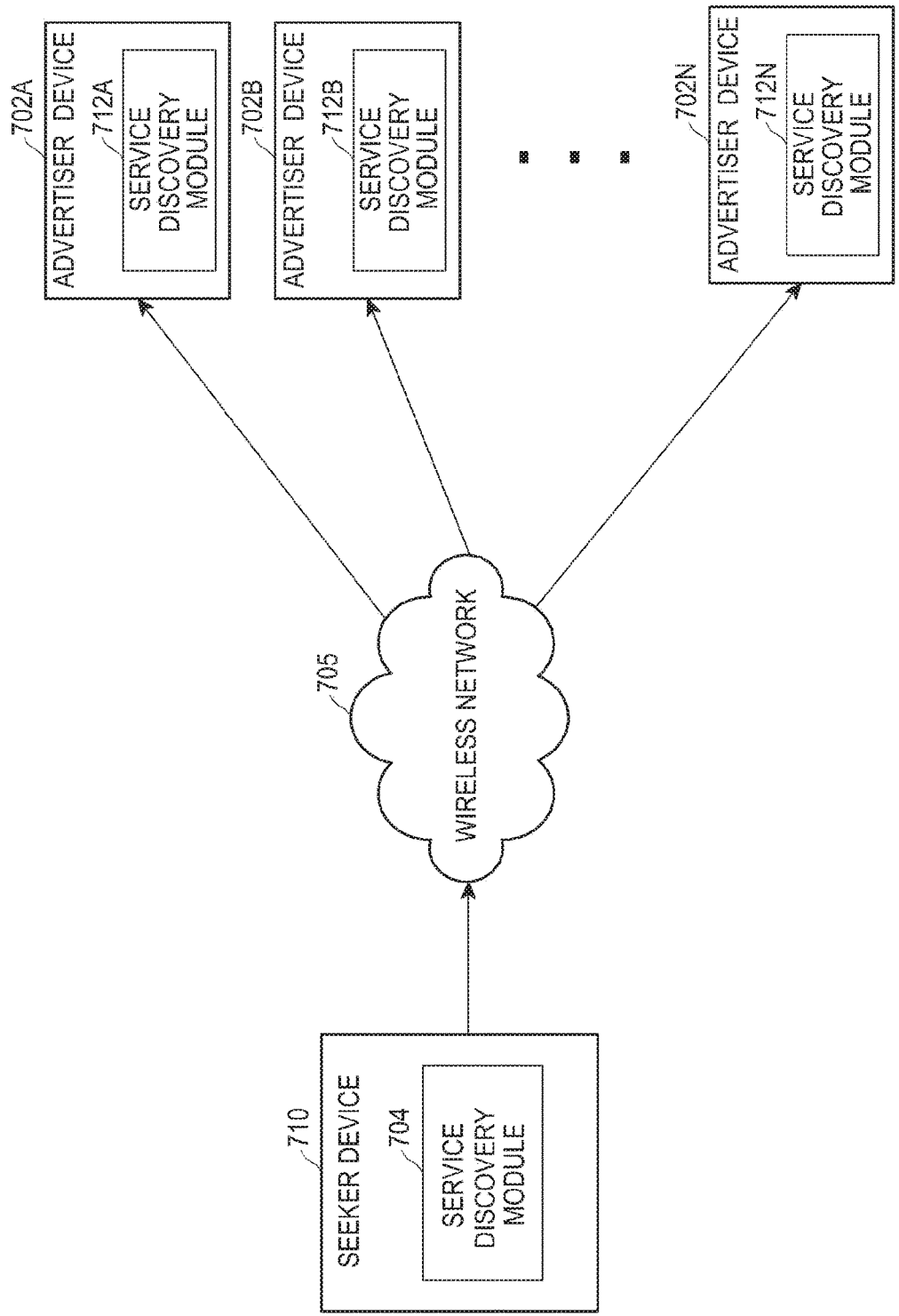
FIG. 7 is a block diagram illustrating a wireless communication system, according to an embodiment of the present invention.

FIG. 7 is a block diagram illustrating a wireless communication system, according to an embodiment of the present invention.

Referring to FIG. 7, the wireless communication system includes a seeker device 710 and a plurality of advertiser devices 702A to 702N that are wirelessly connected through a wireless network 705.

The seeker device 710 includes a service discovery module 704. The seeker device 710 generates a probe request and transmits the probe request for service discovery to one or more advertiser devices among the plurality of advertiser devices 702A to 702N. Here, the probe request includes class information and sub class information of a plurality of advertiser devices. The advertiser devices 702A to 702N may transmit a probe response to the seeker device 710.

Further, the plurality of advertiser devices 702A to 702N include service discovery modules 712A to 712N.

The seeker device 710 and the plurality of advertiser devices 702A to 702N may include one or more hardware components in conjunction with the illustrated service discovery modules 704 and 712A to 712N, such as a processor, memory, a removable storage, a non-removable storage, a bus and a network interface. The functionalities of these hardware components are not mentioned in detail herein as they are well known to a person skilled in the art.

Further, the seeker device 710 and the plurality of advertiser devices 702A to 702N may include or have access to one or more user input devices, one or more output devices, and one or more communication connections such as a network interface card or a USB connection. The one or more user input devices may be keyboard, mouse, etc. The one or more output devices may be a display. The communication connections may include mobile networks such as General Packet Radio Service (GPRS), Wireless Fidelity (Wi-Fi®), Worldwide Interoperability for Microwave Access (WiMax), Long Term Evolution (LTE), etc.

The service discovery modules 704 and 712A to 712N support Internet Protocol (IP) based wireless communication for the Wi-Fi® devices such as the seeker device 710 and the advertiser devices 702A to 702N and are configured for transmitting and receiving various frames such as a probe request frame, a probe response frame, etc.

Control units may control the overall operations of the seeker device 710 and the advertiser devices 702A to 702N. More particularly, a control unit of the seeker device 710 controls an operation to generate a probe request including class and sub class information of the plurality of advertiser devices 702A to 702N, identify type of the advertiser devices 702A to 702N based on the received class and sub class information associated with the advertiser device 702A to 702N, and to display the type of the identified advertiser devices 702A to 702N on a display screen of the seeker device 710.

The control units of the advertiser devices 702A to 702N are adapted for defining a set of service names corresponding to a plurality of services available at one or more advertiser devices 702A to 702N, generating a hash set for each of the defined set of service names, wherein the hash set includes a defined service name, class codes, and sub class codes corresponding to at least one of the advertiser devices 702A to 702N, and appending the generated hash set in the probe request.

In addition, the control units may control regular operations of the seeker device 710 and the advertiser devices 702A to 702N. For example, when an application using mobile communication is executed, the control units may control operations related to mobile communication. When an application using a local network is executed, the control units may control operations related to local networking.

The Wi-Fi® device of an exemplary embodiment of the present invention may be any form of information and communication appliance, such as a mobile communication terminal supporting a communication protocol for a communication system, a smart phone, a Portable Multimedia Player (PMP), a digital broadcast receiver, a PDA, a music player such as a Moving Picture Experts Group (MPEG)-1 or MPEG-2 audio layer 3 (MP3) player, or a portable game console. The Wi-Fi® device of an exemplary embodiment of the present invention may be applied to medium to large sized devices such as a television set, a large format display, digital signage, a media kiosk, a personal computer, a laptop, a printer, a multifunction office machine, etc.

In the embodiments described herein, a Wi-Fi® device discovers multiple support devices in a wireless environment. The embodiments of the present invention allow a directed search for a user of a Wi-Fi® device to search plurality of Wi-Fi® devices using particular USB class information. The embodiments of the present invention also provide optimized methods of generating a single hash function for a string of service information and hence avoiding a separate service discovery mechanism.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

The invention claimed is:

1. A method of a seeker device for providing service discovery in a wireless communication system, the method comprising:
   generating, by the seeker device, a probe request for service discovery, the probe request including hash pairs for a service that the seeker device is searching for, wherein the hash pairs include multiple hash values corresponding to a service name, class information and sub class information of the service to identify at least one advertiser device at which the service is available;
   transmitting, by a wireless broadcasting transmitter of the seeker device, the probe request; and
   receiving, by a wireless receiver of the seeker device, at least one probe response from the at least one advertiser device which has a hash set matching the hash pairs in the probe request,
   wherein the probe response includes information regarding the hash pairs in the probe request.

2. The method of claim 1, further comprising:
   identifying an advertiser device type of the at least one advertiser device, based on the class information and the sub class information associated with the at least one advertiser device; and
   displaying the identified advertiser device type on a display screen of the seeker device.

3. The method of claim 1, wherein generating the probe request comprises:
   defining a set of service names corresponding to a plurality of services available at the at least one advertiser device;
   generating a hash set for each of the defined set of service names, wherein the hash set includes at least one of the defined service name, a class code, and a sub class code corresponding to the at least one advertiser device; and
   appending the generated hash set in the probe request.

4. The method of claim 3, wherein generating the hash set for each of the defined set of service names comprises:
   generating a bit map of a predefined hash set for each class and sub class of the at least one advertiser device;
   inputting the generated bit map of the predefined hash sets to a bloom filter;
   performing a logic function between each of the generated bit maps corresponding to the at least one advertiser device; and
   receiving, from the bloom filter, a resultant bit map that is an aggregated hash value corresponding to a second hash value.

5. The method of claim 4, wherein the second hash value corresponds to a sequence of hash values of a service name and a class and sub class associated with each of the at least one advertiser device.

6. The method of claim 3, wherein the hash pairs include the hash values listed in a predetermined sequence.

7. The method of claim 3, wherein generating the hash set for each of the defined set of service names comprises creating a hash set including a reverse domain name system (DNS) service name with a device role, a class code and a sub class code as a string of information.

8. The method of claim 1, wherein the probe response comprises:
   a service name with an advertiser device role;
   a class information string including a class code and a sub class code, and
   an advertise service attribute element providing information for the service offered by the at least one advertiser device.

9. An apparatus of a seeker device for performing service discovery in a wireless communication system, the apparatus comprising:
   a processor configured to generate a probe request for service discovery, the probe request including hash pairs for a service that the seeker device is searching for, wherein the hash pairs include multiple hash values corresponding to a service name, class information and sub class information of the service to identify at least one advertiser device at which the service is available; and
   a broadcasting transmitter configured to transmit the probe request; and
   a receiver configured to receive at least one probe response from the at least one advertiser device which has a hash set matching the hash pairs in the probe request,
   wherein the probe response includes information regarding the hash pairs in the probe request.

10. A method of an advertiser device for providing at least one service in a wireless communication system, the method comprising:
    receiving, by a wireless receiver of the advertiser device from a seeker device, a probe request for service discovery, the probe request including hash pairs for a service that the seeker device is searching for, wherein the hash pairs include multiple hash values corresponding to a service name, class information and sub class information of the service to identify at least one advertiser device at which the service is available;
    confirming whether a service available at the advertiser device and the hash pairs in the received probe request are matched; and
    transmitting, by a wireless transmitter of the advertiser device, at least one probe response to the seeker device, when the service available at the advertiser device and the hash pairs in the received probe request are matched,
    wherein the probe response includes information regarding the hash pairs in the probe request.

11. An apparatus of an advertiser device for providing at least one service in a wireless communication system, the apparatus comprising:
    a wireless receiver of the advertiser device configured to receive a probe request for service discovery, the probe request including hash pairs for a service that the seeker device is searching for, wherein the hash pairs include multiple hash values corresponding to a service name, class information and sub class information of the service to identify at least one advertiser device at which the service is available;

a processor configured to confirm whether a service available at the advertiser device and the hash pairs in the received probe request are matched; and a wireless transmitter of the advertiser device configured to transmit at least one probe response to the seeker device, when the service available at the advertiser device and the hash pairs in the received probe request are matched, wherein the probe response includes information regarding the hash pairs in the probe request.

* * * * *